United States Patent [19]

Flinn et al.

[11] Patent Number: 4,599,060

[45] Date of Patent: Jul. 8, 1986

[54] DIE-TARGET FOR DYNAMIC POWDER CONSOLIDATION

[75] Inventors: John E. Flinn, Idaho Falls; Gary E. Korth, Blackfoot, both of Id.

[73] Assignee: The United States of America as represented by the United States Department of Energy, Washington, D.C.

[21] Appl. No.: 749,373

[22] Filed: Jun. 27, 1985

[51] Int. Cl.[4] .......... B29C 7/00

[52] U.S. Cl. .......... 425/1; 425/78

[58] Field of Search .......... 425/1, 78

[56] References Cited

U.S. PATENT DOCUMENTS

| | | | |
|---|---|---|---|
| 3,068,822 | 12/1962 | Orr et al. | 425/1 X |
| 3,165,826 | 1/1965 | Bentov | 425/1 X |
| 3,408,432 | 10/1968 | Tumm et al. | 425/1 X |
| 3,574,609 | 4/1971 | Finlay et al. . | |
| 3,591,916 | 7/1971 | Arthur et al. . | |
| 3,643,481 | 2/1972 | Hertel et al. . | |
| 3,645,521 | 2/1972 | Green et al. | 425/1 X |
| 3,827,921 | 8/1974 | Sherby et al. . | |
| 3,998,665 | 12/1976 | Oshida . | |
| 4,113,522 | 9/1978 | Hamilton et al. . | |
| 4,254,184 | 3/1981 | Tsukagoshi et al. . | |

OTHER PUBLICATIONS

"Metallurgy of High Rate Consolidation I", J. of Metals, vol. 36, pp. 12–13, 22–23, Abstracts presented in 1984 Fall Meeting, AIME/TMS.

*Primary Examiner*—J. Howard Flint, Jr.
*Attorney, Agent, or Firm*—Hugh W. Glenn; Robert J. Fisher; Judson R. Hightower

[57] ABSTRACT

A die/target is disclosed for consolidation of a powder, especially an atomized rapidly solidified metal powder, to produce monoliths by the dynamic action of a shock wave, especially a shock wave produced by the detonation of an explosive charge. The die/target comprises a rectangular metal block having a square primary surface with four rectangular mold cavities formed therein to receive the powder. The cavities are located away from the geometrical center of the primary surface and are distributed around such center while also being located away from the geometrical diagonals of the primary surface to reduce the action of reflected waves so as to avoid tensile cracking of the monoliths. The primary surface is covered by a powder retention plate which is engaged by a flyer plate to transmit the shock wave to the primary surface and the powder. Spawl plates are adhesively mounted on other surfaces of the block to act as momentum traps so as to reduce reflected waves in the block.

20 Claims, 5 Drawing Figures

DIE-TARGET FOR DYNAMIC POWDER CONSOLIDATION

CONTRACTUAL ORIGIN OF THE INVENTION

The U.S. Government has rights in this invention pursuant to Contract No. DE-ACO7-76ID01570 between the U.S. Department of Energy and EG&G Idaho, Inc.

FIELD OF THE INVENTION

This invention relates to the consolidation of powders, especially atomized rapidly solidified metal powders, to form monolithic members by the dynamic action of shock waves, especially shock waves produced by the detonation of explosive charges.

BACKGROUND OF THE INVENTION

Attempts have been made to consolidate powders, especially metal powders, solely by the dynamic action of shock waves, especially shock waves produced by the detonation of explosives, with the object of producing fully dense monolithic bodies or members, referred to as monoliths for brevity. Such monoliths are useful as machine parts and as workpieces from which machine parts can be produced by machining and grinding operations.

There has been a special interest in attempting to consolidate alloy metal powders, especially stainless steel (SS) powders, which have been produced by rapid solidification processes (RSP). Monoliths produced by the dynamic consolidation of RSP alloys can have a variety of advantages, including improved mechanical properties, improved corrosion resistance, chemical homogeneity, extended solubility limits, very fine microstructures, and desirable metastable phases.

RSP powders can be produced by the centrifugal atomization (CA) process, in which the molten alloy is centrifugally atomized and then cooled very rapidly to produce rapid solidification. RSP powders can also be produced by the dissolved gas atomization process, in which a gas, usually hydrogen, is dissolved under pressure in the molten alloy, which is then atomized into an intensely cold vacuum environment, to produce rapid solidification of the alloy as a very fine powder.

Attempts have been made to consolidate RSP powders by utilizing a die/target having a mold cavity in the center of the flat upper surface of the die/target, filling the mold cavity with the powder to be consolidated, covering the mold cavity with a plate mounted on the flat surface, and detonating an explosive charge above the die/target to subject the powder and the die/target to an intense shock wave. If a sufficiently powerful explosive is used, the powder can be consolidated into a monolith, but problems have been encountered with the formation of tensile cracks in the monolith, so that the monolith is useless as a machine part or a workpiece.

One principal object of the present invention is to provide a new and improved die/target, whereby fully consolidated monoliths can be produced which are fully dense and free from cracks.

SUMMARY OF THE INVENTION

To accomplish this and other objects, the present invention provides a die/target for consolidation of a powder to produce monolithic members by the dynamic action of a shock wave, such die/target comprising means forming a metal block having a primary surface for receiving the shock wave, such primary surface having at least one mold cavity formed therein to receive powder to be consolidated, the cavity being located away from the geometrical center of the primary surface to reduce the effect of reflected waves so as to avoid tensile cracking of the monolithic member formed by consolidation of the powder in the cavity by the shock wave.

The shock wave is preferably produced by detonating a powerful explosive charge above the primary surface of the die/target.

It is preferable to mount a powder retaining plate on the primary surface, to cover the mold cavity, and also to provide a flyer plate for engaging the powder retaining plate, to transmit the shock wave to the primary surface and to the powder.

The primary surface preferably has a plurality of such mold cavities formed therein to receive the powder to be consolidated. The cavities are located away from the geometrical center of the primary surface and are distributed around such center. In particular, it is preferred to provide four such mold cavities in the primary surface.

The primary surface is preferably in the shape of a polygon, and the mold cavity or cavities are located away from the geometrical diagonals of the polygon to avoid tensile cracking of the monolithic member by reflected waves.

More specifically, the metal block is preferably rectangular in shape and the primary surface is preferably rectangular, especially square in shape. The mold cavity or cavities are located away from the geometrical diagonals of the primary surface.

Preferably, the mold cavities are generally rectangular in shape and are oriented with their sides generally parallel with the sides of the rectangular metal block.

The metal block preferably has boundary surfaces, in addition to the primary surface. Preferably, one or more spawl plates or members are adhesively secured to the boundary surfaces to act as momentum traps and thereby to reduce reflected waves.

More specifically, the metal block is preferably rectangular, with four lateral boundary surfaces, on which spawl plates are adhesively mounted. The momentum imparted to the spawl plates by the initial compressive wave front of the shock wave causes the spawl plates to fall off the metal block, so that such momentum is trapped and can not cause reflections in the metal block.

Spawl plates may also be mounted on the boundary surfaces of the flyer plate.

It is possible to produce the shock wave by means other than the detonation of an explosive charge. Specifically, the shock wave may be produced by the impact of a projectile, shot with an extremely high velocity against the powder retaining plate on the primary surface of the die/target block. In this case, the flyer plate may be carried on the front of the projectile. The projectile may be shot by a gas gun or some other suitable means.

When the shock wave is to be produced by a projectile, spawl plates are preferably mounted on all of the boundary surfaces of the die/target block.

With the die/target of the present invention, a variety of metal powders can be consolidated to produce fully dense monoliths. In actual practive, type 304 stainless steel (SS) powders have been successfully consolidated to produce fully dense monoliths which are free from cracks. This applies to such SS powders which are of the RSP type, both CA and DGA. To a great extent, the unique and valuable characteristics of the RSP powders are carried over into the consolidated monoliths.

Copper powders have also been successfully consolidated into fully dense monoliths which are crack-free.

BRIEF DESCRIPTION OF THE DRAWINGS

Further objects, advantages and features of the present invention will appear from the following description, taken with the accompanying drawings, in which.

DETAILED DESCRIPTION OF ILLUSTRATIVE EMBODIMENTS

Figure 2:
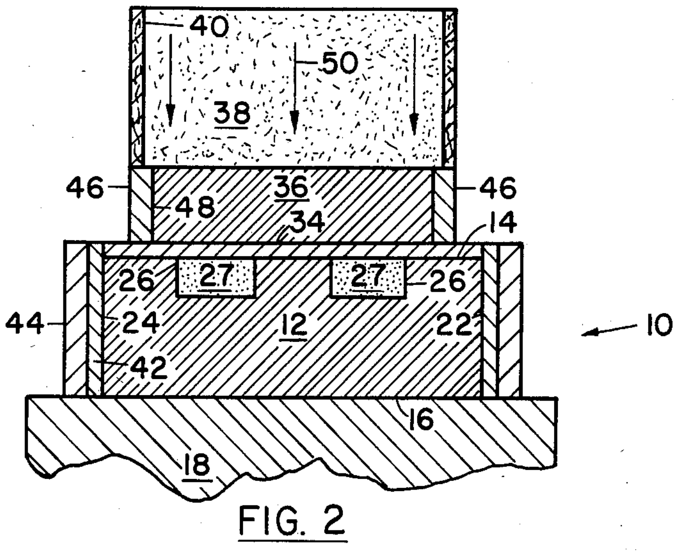
FIG. 2 is a sectional view, taken generally along the line 2—2 in FIG. 1, showing the die/target assembled with other components to form an apparatus for consolidating metal powders to produce fully dense monoliths which are crack-free.
Figure 1:
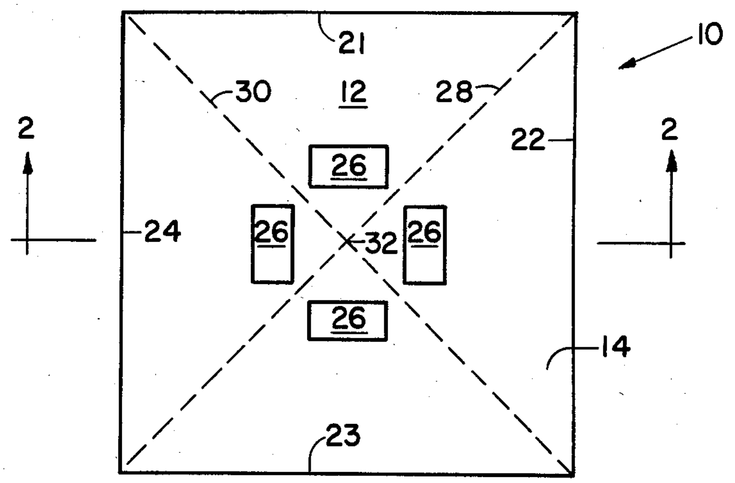
FIG. 1 is a diagrammatic plan view of a die/target to be described as an illustrative embodiment of the present invention.

FIGS. 1 and 2 show an illustrative embodiment of the present invention, in the form of a die/target 10 comprising means forming a die/target block 12, which in this case is formed in one piece, preferably of stainless steel or some other suitable material. The block 12 is generally rectangular in shape, which is believed to be the best mode, but other shapes might be employed in some circumstances.

The die/target block 12 has a primary surface 14, which in this instance is the upper surface, adapted to receive ths shock wave. The primary surface 14 is in the shape of a polygon, preferably rectangular and in this case square in shape.

In addition to the primary surface 14, the die/target block 12 has boundary surfaces, including an opposite or bottom surface 16, illustrated as resting upon a pedestal or base 18, which is preferably massive in construction.

The die/target block 12 has other boundary surfaces, constituting side surfaces, illustrated as comprising four side surfaces 21, 22, 23 and 24.

The primary surface 14 of the die/target block 12 is formed with one or more mold cavities, illustrated as comprising four mold cavities 26, adapted to receive the powder which is to be consolidated. In FIG. 2, the cavities 26 are shown as being filled with metal powder 27. The cavities 26 are located away from the geometrical center of the primary surface 14, and also away from the geometrical diagonals of the primary surface. In FIG. 1, the geometrical diagonals are indicated by broken lines 28 and 30, which intersect at the geometrical center. It will be noted that the cavities 26 do not overlap the diagonals 28 and 30, and also do not overlap the geometrical center 32. The location of the cavities 26 is effective to reduce the action of reflected waves on the cavities 26, and to avoid the formation of tensile cracks in the monoliths which are consolidated in the cavities.

The mold cavities 26 are distributed around the geometrical center 32 and are illustrated as being symmetrically and evenly distributed. The primary surface 14, because of its square shape, is also symmetrically distributed around the geometrical axis 32.

As shown, the mold cavities 26 are generally rectangular in shape, to produce generally rectangular monoliths. The rectangular shape has given good results, but other shapes may be employed. As shown, the sides of the rectangular cavities 26 are parallel with the corresponding sides of the die/target block 12.

As shown, the rectangular mold cavities 26 have longer and shorter sides. The longer sides are symmetrical about the geometrical center 32 and are parallel with the closest side surfaces of the die/target block 12.

In FIG. 2, the die/target block 12 is shown assembled with other components, including a powder retaining plate 34, also sometimes referred to as a cover or punch plate, which engages the primary surface 14 and covers the mold cavities 26, so as to retain the metal powder 27 therein. The powder retaining plate 34 is preferably made of copper or some other relatively soft metal. In the apparatus of FIG. 2, the plate 34 rests on the primary surface 14 by gravity, and does not need to be secured to the die/target block 12.

A flyer plate or member 36 engages the powder retaining plate 34, and, in turn, supports an explosive charge 38, contained within a fiber tube or casing 40. The flyer plate 36 is made of stainless steel or some other suitable material and is effective to transmit the explosive shock wave to the primary surface 14 of the die/target block 12, by way of the cover or punch plate 34. The flyer plate 36 is in the shape of a polygon, preferably rectangular.

In the apparatus of FIG. 2, at least some of the boundary surfaces of the block 12 are provided with spawl plates which are initially secured in place, but are adapted to fall off when impacted by the explosive shock wave. Specifically, each of the four side surfaces 21–24 of the block 12 is provided with two spawl plates 42 and 44, which are adhesively secured in place, preferably by means of a thin layer of an epoxy cement. Thus, the first four spawl plates 42 are cemented to the four side surfaces 21–24 of the block 12. The second four spawl plates 44 are cemented to the outer surfaces of the first four spawl plates 42.

The spawl plates 42 and 44 act as momentum traps, because the plates are ejected laterally by the momentum imparted to them by the initial compressive shock wave. Such trapped momentum can not cause reflections in the die/target block 12, so that reflections are reduced.

As shown in FIG. 2, the flyer plate 36 has spawl plates 46 which are adhesively secured to the boundary or edge surfaces 48 of the flyer plate. The spawl plates 46 are also ejected laterally by the initial compressive shock wave, so that the spawl plates 46 also act as momentum traps to reduce reflections in the flyer plate 36.

The die cavities 26 may have rounded corners, as shown in FIG. 2, or the corners may be square. It is easier to form the die cavities 26 with rounded corners by ordinary machining operations in the one-piece die/target block 12.

In use, the explosive charge 38, the flyer plate 36, and the cover or punch plate 34 are removed. The die cavities 26 are filled with the powder 27 to be consolidated, usually a metal powder. Examples of specific metal powders will be described presently. The cover plate 34 is then mounted on the primary surface 14 and may simply be retained thereon by gravity. The flyer plate 36 is mounted on the cover plate 34, and may simply be retained by gravity. The explosive charge 38 is then placed on the flyer plate 36 and again may simply be retained by gravity.

The explosive charge 38 is then detonated by suitable means, as by one or more blasting caps. The detonation of the explosive charge 38 produces a high velocity compressive shock wave, the downward component of which is represented by the arrows 50 in FIG. 2. Such compressive shock wave is transmitted by the flyer plate 36 and the punch plate 34 to the primary surface 14 and also to the powder 27 in the mold cavities 26. The punch plate 34 is compressed against the powder 27 and into the mold cavities 26 to some extent. The explosive charge 38 is made sufficiently powerful to insure that the compressive shock wave consolidates the powder 27 into a fully dense monolith in which the powder particles are bonded together.

The location of the die cavities 26, away from the geometrical center 32 and away from the diagonals 28 and 30 of the primary surface 14, effectively reduces the action of reflected waves in the die/target block 12, so that monoliths can be produced which are free from tensile cracks. The crack-free monoliths are useful as mechanical components, or as workpieces from which mechanical components can be machined.

The initial compressive shock wave, produced by the detonation of the explosive charge 38, imparts momentum to the spawl plates 42, 44 and 46 and causes them to be ejected laterally from the die/target block 12 and the flyer plate 36. The momentum thus trapped in the spawl plates does not cause reflections, so that reflected waves in the block 12 are reduced. The momentum trapping action of the spawl plates contributes to the production of crack-free monoliths by reducing the tensile stresses in the monoliths, produced by the reflected waves.

In actual experiments, fully dense crack-free monoliths have been produced by the explosive consolidation of metal alloy powders made by rapid solidification processes (RSP). Successful consolidation experiments have been carried out using RSP powders made of Type 304 stainless steel (SS) produced by both centrifugal atomization (CA) and dissolved gas atomization (DGA). Both atomization processes have been briefly described above.

The CA powder was produced by Pratt and Whitney, using a very rapid ascribed cooling rate of approximately $10^5$ K/s. The average particle size was approximately 80 microns. The CA powder displayed ferritic properties, as demonstrated by magnetic attraction and X-ray diffraction. A sample of the CA powder was magnetically separated, which showed the magnetic fraction to be about 22% by weight. As to crystal structure, X-ray analysis showed this magnetic fraction to be about 50% body centered cubic (bcc). The particle size distribution of the magnetic fraction was essentially the same as it was for the unseparated powder.

The DGA powder was produced by Homogeneous Metals, using a cooling rate of approximately 100 K/s. The average particle size was approximately 40 microsn. Magnetic separation was not possible, because essentially all particles were at least partially magnetic. As to crystal structure, X-ray diffraction analysis of various particle size fractions showed that the occurrence of bcc phase in the DGA powder was independent of particle size.

In the successful dynamic consolidation experiments, the chemical composition of the DGA and CA Type 304 stainless steel powders was approximately as shown in the following table:

| | Fe | Ni | Cr | Mn | Si | Mo | Cu | S | P | C |
|---|---|---|---|---|---|---|---|---|---|---|
| DGA | 71.0 | 9.9 | 19.0 | 0.03 | 0.04 | 0.02 | 0.005 | 0.005 | 0.005 | 0.02 |
| CA | 70.5 | 9.1 | 18.4 | 0.8 | 0.7 | 0.6 | 0.5 | 0.002 | 0.02 | 0.05 |

The density of the powders, before and after five minutes of ultrasonic vibration, is shown in the following table, in terms of grams per cubic centimeter, and the percentage of the theoretical fully dense value of 7.9 grams per cubic centimeter (g/cc):

| | Pour Density | | Settle Density | |
|---|---|---|---|---|
| | g/cc | % | g/cc | % |
| DGA | 4.34 | 54.9 | 5.17 | 65.4 |
| CA | 4.60 | 58.2 | 5.26 | 66.6 |

In performing the successful dynamic consolidation experiments, it was found that the use of powerful, high velocity explosives was necessary to achieve fully dense consolidation of the Type 304 SS powders. With the use of sufficiently powerful explosives, full metallurgical bonding was achieved between the particles of the powders. Less powerful explosives did not achieve full metallurgical bonding of the particles.

In the actual experiments, fully dense consolidation of the Type 304 SS powders, with full metallurgical bonding between the particles, was achieved by the use of two powerful, high velocity explosives. The first explosive was C-4, a military demolition explosive having a density of about 1.59 grams per cubic centimeter; a detonation velocity of about 7.9 kilometers per second; and a detonation pressure of about 26.0 gigapascals (GPa). The other successful explosive was a commercially available geophysical prospecting dynmite, VIBROGEL 3, having a density of 1.50 grams per cubic centimeter; a detonation velocity of 6.5 kilometers per second; and a detonation pressure of 16.9 GPa. VIBROGEL is the registered trademark of the manufacturer, Hercules Incorporated.

The composition of the C-4 military explosive is as follows:

91% RDX
2% Poly-isobutylene
1.6% Motor oil
5.3% Di-(2-Ethylhexyl)Sebate

The composition of VIBROGEL 3 is approximately as follows:

49.6% Nitro-glycerin
38.9% $NaNO_3$
1.2% Nitro-cellulose
8.3% Carbonaceous Fuel
1.1% Anti-acid
0.9% $H_2O$ The detonation pressure of 16.9 GPa, previously given for the VIBROGEL 3 explosive, is an empirical value for an infinite diameter. The peak compressive stress wave in the apparatus of FIGS. 1 and 2 may be somewhat higher. Computer studies indicate that the peak compressive stress wave in the vicinity of the powder cavities 26 is approximately 20.0 GPa.

Figure 5:
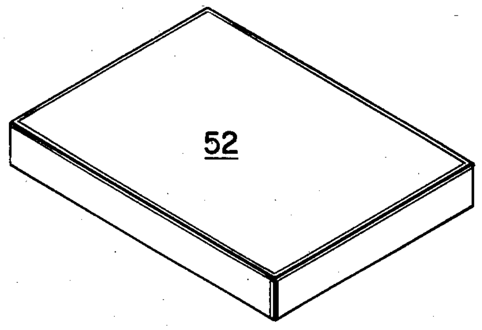
FIG. 5 is a diagrammatic enlarged perspective view showing a monolith, consolidated from metal powder, in accordance with the present invention.

FIG. 5 illustrates a monolith 52 which is typical of the monoliths produced by dynamic consolidation of metal powders in accordance with the present invention. The shape of the monolith 52 corresponds with the shape of the mold cavity in the die/target of the present invention. The monolithic member 52 of FIG. 5 is in the shape of a small rectangular plate. The fully consolidated monoliths have been examined by making optical micrographs, electron microscope studies, and X-ray diffraction studies. From the optical micrographs, it appears that there has been more massive extrusion of the powder particles near the edges of the monoliths, especially near the bottom. Some evidence of melting appears on the bottom edge.

Microhardness measurements have also been made in some of the typical types of structure, observed in the consolidated monolith. The bulk of the monolith generally shows a hardness of approximately 350 DPH, which is approximately equivalent to the hardness of Type 304 stainless steel, cold worked approximately 50%. The areas characterized by fairly massive extrusion of the individual particles were somewhat softer. As to the suspected melted zones, which were observed only within about 0.1 millimeter of the bottom surface, the hardness values were approximately the same as the hardness values of the pre-shocked particles. These observations apply to monoliths consolidated from both DGA and CA powders of Type 304 stainless steel.

Tensile strength studies were also made of the consolidated monoliths by producing miniature tensile bars, which were machined from one of the monoliths. The bars were then tested for tensile strength at room temperature. Such tensile tests showed a 0.2% yield strength of about 740 megapascals (MPa) and an ultimate strength of more than 1,050 MPa.

By using a compression indentor technique, the Naval Research Laboratory also obtained some tensile properties, indicating a 0.2% yield strength of about 717 MPa, and an ultimate strength of about 1,434 MPa.

For comparison, the same RSP powders made of Type 304 stainless steel were also consolidated by hot extrusion at 900° C. The samples consolidated by hot extrusion showed a 0.2% yield strength of about 340 MPa, and an ultimate strength of about 743 MPa. Thus, the dynamically consolidated monoliths exhibited substantially greater tensile strength than the samples consolidated by hot extrusion.

The dynamically consolidated monoliths exhibited substantially greater tensile strength than the samples consolidated by hot extrusion.

The dynamically consolidated monoliths were examined by X-ray diffraction to track the retention of the body centered cubic (bcc) phase after the dynamic consolidation. The results of these examinations show that the bcc phase is quite stable and was substantially unaffected by the dynamic consolidation. Similar studies were made on samples consolidated by hot extrusion. Such studies indicated that the bcc phase was substantially unaffected by the consolidation by hot extrusion.

Copper powder has also been fully consolidated into monoliths by dynamic consolidation, using the die/target of the present invention.

It was also found to be possible to employ dynamic consolidation to produce a laminated monolith comprising a layer of consolidated copper powder and a layer of consolidated RSP Type 304 stainless steel powder. To produce such a laminated monolith, a die cavity 26 is filled half full of copper powder, leveled off, and then filled to the top with RSP Type 304 stainless steel powder. The powders were then fully consolidated by detonating an explosive charge. The powders were fully consolidated into a single laminated monolith with a definite line of demarcation between the consolidated copper powder and the consolidated stainless steel powder. Very little mixing of the two powders occurs during the consolidation process. The interaction or bonding between the copper and stainless steel particles was confined to the nearest neighbor.

Figure 3:
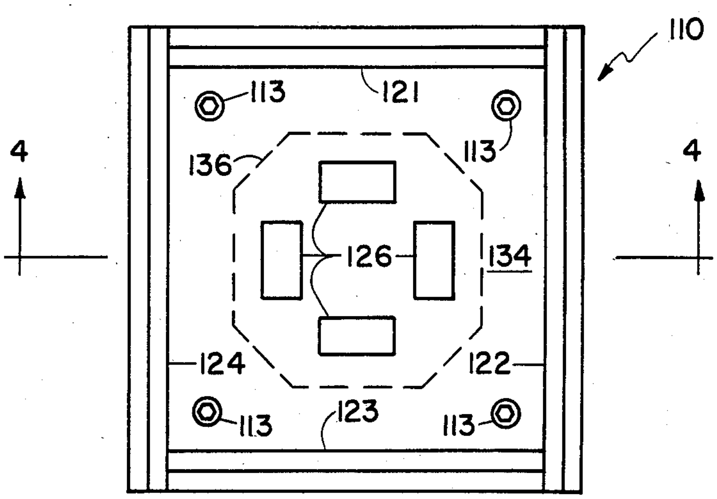
FIG. 3 is a plan view of a modified die/target, assembled with other components to form an apparatus for consolidating metal powders, using a shock wave produced by the impact of a projectile shot by a gas gun.
Figure 4:
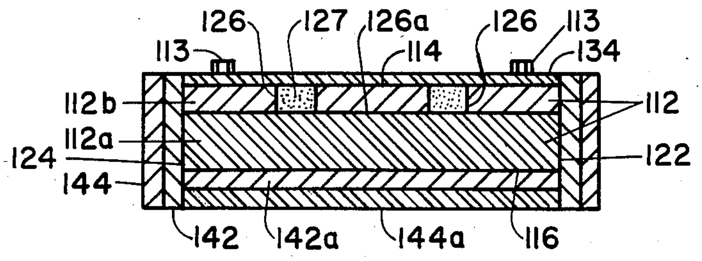
FIG. 4 is a sectional view, taken generally along the line 4—4 in FIG. 3.

FIGS. 3 and 4 illustrate a modified die/target 110 which is basically quite similar to the die/target 10 of FIGS. 1 and 2. To the extent that the die/targets 110 and 10 are the same or very similar, the same reference characters will be employed in FIGS. 3 and 4, as in FIGS. 1 and 2, but increased by 100, so that the above description of FIGS. 1 and 2 can readily be applied to FIGS. 3 and 4. It thus will be unnecessary to repeat much of the previous description. The following description will concentrate on the differences between the die/targets 110 and 10.

The die/target 110 of FIGS. 3 and 4 may be regarded as a scaled-down version of the die/target 10. In the case of the die/target 10, a high explosive charge is intended to be employed to cosolidate the metal powder 27 in the die cavities 26. The detonation of the explosive charge provides a powerful compressive shock wave which accomplishes the dynamic consolidation of the powder.

In the case of the die/target 110 of FIGS. 3 and 4, it is intended that the shock wave be provided by the impact of a high velocity projectile upon the die/target 110 and its associated components. The projectile may be shot by a gas gun or some other suitable means.

In FIGS. 3 and 4, the die/target 110 comprises a two-piece die/target block 112, including a base block **112*a* and a cavity block 112*b* which are suitably fastened together, as by means of the illustrated screws 113. The base block 112*a* and the cavity block 112*b* are both generally rectangular in shape. The compressive shock wave is adapted to be received by a primary surface 114 on the outer side of the cavity block 112*b***.

The base block **112*a* has an opposite or bottom boundary surface 116. The two-piece die/target block 112 has four side boundary surfaces, 121, 122, 123 and 124**.

As before, the die/target block 112 has four generally rectangular mold cavities 126, which are substantially the same as the previously described mold cavities 26, except that the mold cavities 126 are formed as rectangular square-cornered openings in the cavity block **112*b*. The base block 112*a* has a surface 126*a* which forms the bottom surface of all four cavities 126**.

As in the case of the cavities 26, the cavities 126 are located away from the geometrical center of the primary surface 114, and also away from the geometrical diagonals of the primary surface. In FIG. 3, the diagonals have not been drawn in, as being unnecessary, because the diagonals 28 and 30 are clearly shown in FIG. 1, as is the geometrical center. In FIG. 3, as in FIG. 1, the mold cavities 126 are symmetrically distributed around the geometrical center of the primary surface 114, which is square in shape, as before.

As previously described in connection with FIGS. 1 and 2, the location of the mold cavities 126, away from the geometrical center and away from the diagonals, effectively reduces the action of reflected waves, so as to avoid the formation of tensile cracks in the monoliths formed in the cavities 126 by the dynamic consolidation of the metal powder 127.

As before, the primary surface 114 is covered by a powder retaining plate 134, also referred to as a cover plate or punch plate. The plate 134 retains the metal powder 127 in the cavities 126, until the powder is consolidated. In this case, the screws 113 are employed for removably securing the cover plate 134 against the primary surface 114. In this way, the die/target 110 can be used in a vertical position, rather than in the horizontal position, shown in FIGS. 3 and 4.

The flyer plate is not shown in FIGS. 3 and 4, because the flyer plate is generally attached to the front of the projectile. However, FIG. 3 shows a polygon 136 in broken lines, representing the impact area of the flyer plate, when the projectile strikes the die/target 110.

As before, each of the four boundary sides 121–124 of the die/target block 112 is provided with two successive spawl plates 142 and 144, which may be adhesively mounted, as by means of an epoxy cement. The spawl plates 142 are cemented to the four side walls 121–124, while the spawl plates 144 are cemented to the spawl plates 142.

In this case, the bottom or opposite boundary surface 116 is also provided with two successive spawl plates 142*a* and 144*a* which are adhesively secured, as by means of an epoxy cement. The spawl plate 142*a* is cemented to the surface 116, while the spawl plate 144*a* is cemented to the spawl plate 142*a*.

In use, the screws 113 and the cover plate 134 are removed, so that the mold cavities 126 can be filled with the metal powder 127. The plate 134 and the screws 113 are then reinstalled.

The die/target 110 is then mounted in the impact zone of a gas gun or the like, which is employed to shoot a projectile at a very high velocity against the cover plate 134, which transmits the shock wave to the metal powder 127 and to the primary surface 114 of the die/target block 112. The flyer plate, on the front end of the projectile, impacts against the zone 136, shown by the broken line in FIG. 3. The flyer plate may be made of copper.

The impact of the projectile produces a compressive shock wave which compresses the plate 134 and consolidates the metal powder 127 in the die cavities 126.

The compressive shock wave imparts momentum to the spawl plates 142 and 144, with the result that they are ejected laterally from the die/target block 112. The momentum, thus trapped in the spawl plates 142 and 144, is not reflected into the block 112, so that reflections are reduced.

Similarly, the spawl plates 142*a* and 144*a* are detached and ejected by the momentum imparted to them by the initial compressive shock wave, so that these spawl plates also act as momentum traps.

Generally, the impact zone of the gas gun is provided with a larger catcher or impact tank which is filled with soft material, such as a multiplicity of cotton rags, to catch the various components of the die/target 110, as they fly apart, due to the impact of the projectile, which is also caught by the soft material in the catcher tank. After each shot, the various components are recovered from the soft material in the catcher tank. Such components include the monoliths which are consolidated in the mold cavities 126. In actual tests, RSP metal powders made of Type 304 stainless steel have been successfully consolidated into fully dense, fully bonded monoliths, by using the die/target 110 of FIGS. 3 and 4, in conjunction with a gas gun to shoot a projectile against the die/target. The projectile is shot with a sufficiently high velocity to provide the necessary compressive shock wave, with a sufficiently high peak pressure to achieve fully dense, fully bonded consolidation of the RSP metal powder.

For example, it was found possible to achieve a shock wave having a peak compressive pressure of about 21.1 GPa, by the impact of a gas gun projectile, shot at a high velocity of about 1.01 millimeters per microsecond. This velocity may also be stated as 1.01 kilometers per second.

Both DGA and CA powders made of Type 304 RSP stainless steel have been successfully consolidated into fully dense, fully bonded monoliths, by shock waves produced by the impact of gas gun projectiles, using the die/target 110 of FIGS. 3 and 4.

Generally, the gas gun procedure is limited to the production of relatively small monoliths. The explosive consolidation of monoliths has the advantage that the explosive procedure is adaptable to the production of considerably larger monoliths, by the consolidation of RSP metal powders. Moreover, explosive consolidation of metal powders is adaptable to the production of monoliths having many different shapes.

It is believed that the dynamic consolidation of RSP stainless steel powders will made it possible to reduce the chromium content of the stainless steel alloy, while still producing monoliths having highly satisfactory engineering characteristics.

Various modifications, alternative constructions and equivalents may be employed, within the true spirit and scope of the following claims.

We claim:

1. A die/target for consolidation of a powder to produce monolithic members by the dynamic action of a shock wave, such die/target comprising means forming a metal block having a primary surface for receiving the shock wave, such primary surface having at least one mold cavity formed therein to receive powder to be consolidated, the cavity being located away from the geometrical center of the primary surface to reduce the effect of reflected waves so as to avoid tensile cracking of the monolithic member formed by consolidation of the powder in the cavitiy by the shock wave.

2. A die/target according to claim 1, in which the primary surface has a plurality of such mold cavities formed therein to receive powder to be consolidated, the cavities being located away from the geometrical center of the primary surface and being distributed around such center.

3. A die/target according to claim 1, the primary surface having four such mold cavities formed therein to receive the powder to be consolidated, the cavities being located away from the geometrical center of the primary surface and being distributed around such center.

4. A die/target according to claim 1, the metal block having boundary surfaces in addition to the primary surface, and at least one spawl member adhesively secured to at least one of said boundary surfaces to act as a momentum trap and thereby to reduce reflected waves.

5. A die/target according to claim 1, in which the block has a plurality of boundary surfaces in addition to the primary surface, and a plurality of spawl members adhesively secured to the boundary surfaces to act as momentum traps and thereby to reduce reflected waves.

6. A die/target according to claim 1, including a powder retaining plate mounted on the primary surface and covering the cavity for retaining the powder therein.

7. A die/target according to claim 6, comprising a flyer plate for engaging the powder retaining plate to transmit the shock wave to the primary surface.

8. A die/target according to claim 1, the primary surface being in the shape of a polygon, the cavity being located away from the geometrical diagonals of the polygon to avoid tensile cracking of the monolithic member by reflected waves.

9. A die/target for consolidation of a powder to produce monolithic members by the dynamic action of a shock wave, such die/target comprising means forming a generally rectangular metal block having a generally rectangular primary surface for receiving the shock wave, such primary surface having a plurality of mold cavities formed therein to receive powder to be consolidated, the cavities being located away from the geometrical center of the primary surface and being distributed around such center, the cavities being located away from the geometrical diagonals of the primary surface, the location of the cavities thereby being effective to reduce the action of reflected waves so as to avoid tensile cracking of the monolithic members formed by consolidation of the powder in the cavities by the shock wave.

10. A die/target according to claim 9, in which the cavities are generally rectangular in shape.

11. A die/target according to claim 9, in which the primary surface has four such mold cavities formed therein.

12. A die/target according to claim 9, the primary surface having four such mold cavities formed therein, the cavities being generally rectangular in shape.

13. A die/target according to claim 9, the primary surface being substantially square in shape, the primary surface having four such mold cavities formed therein, the cavities being substantially rectangular in shape.

14. A die/target according to claim 9, including a powder retention plate mounted on the primary surface and covering the cavities for retaining the powder therein.

15. A die/target according to claim 14, including a flyer member for engaging the powder retention plate to transmit the shock wave to the primary surface.

16. A die/target according to claim 9, in which the metal block has boundary surfaces in addition to the primary surface, and spawl members adhesively secured to at least some of said boundary surfaces to act as momentum traps to reduce reflected waves in the block.

17. A die/target for consolidation of an atomized rapidly solidified metal powder to produce monolithic members by the dynamic action of an explosively produced shock wave, such die/target comprising means forming a generally rectangular metal block having a generally square primary surface for receiving the shock wave, such primary surface having four generally rectangular mold cavities formed therein to receive powder to be consolidated into monolithic members by the shock wave, the cavities being located away from the geometrical center of the primary surface and being distributed around such center while also being located away from the geometrical diagonals of the primary surface, the location of the cavities being effective to reduce the action of reflected waves so as to avoid tensile cracking of the monolithic members formed by consolidation of the powder in the cavities by the shock wave, the metal block having boundary surfaces in addition to the primary surface, and spawl members adhesively secured to at least some of said boundary surfaces to act as momentum traps and thereby to reduce reflected waves in the block.

18. A die/target according to claim 17, including a powder retention plate mounted on the primary surface and covering the cavities for retaining the powder therein while also transmitting the shock wave to the powder and to the primary surface.

19. A die/target according to claim 18, including a flyer member for engaging the powder retention plate to transmit the shock wave thereto for transmission to the primary surface and the powder.

20. A die/target according to claim 19, such flyer member having boundary surfaces, and spawl members adhesively secured to at least some of the boundary surfaces of the flyer member.

* * * * *